United States Patent [19]

Capasso et al.

[11] Patent Number: 4,999,485
[45] Date of Patent: Mar. 12, 1991

[54] NONLINEAR OPTICAL DEVICE STRUCTURE WITH COMPOUND SEMICONDUCTOR HAVING GRADED CHEMICAL COMPOSITION

[75] Inventors: Federico Capasso, Westfield; Stephen E. Ralph, North Plainfield, both of N.J.

[73] Assignee: AT&T Bell Laboratories, Murray Hill, N.J.

[21] Appl. No.: 533,999

[22] Filed: Jun. 4, 1990

Related U.S. Application Data

[63] Continuation-in-part of Ser. No. 423,073, Oct. 18, 1989, abandoned.

[51] Int. Cl.[5] .................. H01J 31/50; G02F 1/01; H01L 27/12
[52] U.S. Cl. .................. 250/213 A; 357/30; 350/386; 250/225
[58] Field of Search .............. 250/211 J, 213 A, 225; 357/4, 30 E, 16; 350/386, 353, 354, 96.13, 96.14; 377/102

[56] References Cited

U.S. PATENT DOCUMENTS

| | | | |
|---|---|---|---|
| 4,053,232 | 10/1977 | Dill et al. | 250/225 |
| 4,546,244 | 10/1985 | Miller | 250/211 J |
| 4,626,075 | 12/1986 | Chemla | 350/386 |
| 4,647,339 | 3/1987 | Houghton | 350/386 |
| 4,694,318 | 9/1987 | Capasso | 357/30 |
| 4,737,003 | 4/1988 | Matsumura et al. | 350/354 |
| 4,792,832 | 10/1988 | Baba et al. | 357/4 |
| 4,826,295 | 5/1989 | Burt | 350/386 |
| 4,828,758 | 5/1989 | Gillberg-LaForce et al. | 350/353 |
| 4,840,446 | 6/1989 | Nakamura et al. | 357/30 G |
| 4,862,228 | 8/1989 | Ralph | 357/4 |
| 4,884,119 | 11/1989 | Miller | 357/4 |

OTHER PUBLICATIONS

*Optics Letters*, vol. 11, No. 12, Dec. 1986, "Time-Resolved Self-Defocusing in $Cd_{0.23}Hg_{0.77}Te$ and InSb", by D. Craig et al., pp. 794–796.

Primary Examiner—David C. Nelms
Assistant Examiner—Michael Messinger
Attorney, Agent, or Firm—D. I. Caplan

[57] ABSTRACT

A nonlinear optical device structure is formed by a compound semiconductor having a graded chemical composition such that the average drift velocity of electrons is in the same direction as, but of greater magnitude than, that of holes. In this way, when a pump optical beam (control beam) is flashed (as by a picosecond pulse) upon the structure, electron-hole pairs are created with a resulting temporary spatial separation between the holes and the electron—whereby an electric dipole moment is temporarily induced in the structure. In turn, this dipole moment temporarily modifies either the birefringence or absorption property, or both, with respect to a controlled beam—whereby the polarization, phase, or intensity, of the controlled beam can be modified by the control beam. After the electrons and holes drift to positions which extinguish the dipole the structure is ready for a repeat performance.

12 Claims, 3 Drawing Sheets

NONLINEAR OPTICAL DEVICE STRUCTURE WITH COMPOUND SEMICONDUCTOR HAVING GRADED CHEMICAL COMPOSITION

This application is a continuation-in-part of application Ser. No. 423,073, filed Oct. 18, 1989, now abandoned.

TECHNICAL FIELD

This invention relates to optical (lightwave) communication systems and more particularly to such systems that comprise nonlinear optical devices for controlling optical beams.

BACKGROUND OF THE INVENTION

In an optical communication system, optical processing or other optical system, it is often desired to have nonlinear optical device for modulating or switching a first (controlled) optical propagating through the device. Typically, such a device exhibits a variable absorption of the controlled beam, depending upon the intensity of a second (control) optical beam incident upon the device.

In addition to the aforementioned devices operating on the basis of optical absorption, there have been devices operating on the basis of the photo-refractive effect—i.e., variation of refractive index by the control beam, and hence phase modulation by the control beam. Some of these employ a single beam and some employ multiple beams to modify the refractive index of a nonlinear device structure with respect to the controlled beam—and hence to modify either the intensity or the phase of the controlled beam by the further use of known techniques. Those photo-refractive index modulation structures which employ the single beam require undesirably high power to yield commercially significant modifications of the controlled beam, and those structures which employ the two beams to modify refractive index are undesirable because of the complexity arising from the requirement of the two beams. By "refractive index" is meant the ratio of the phase velocity of an optical beam in vacuum to the speed of the beam in a material.

In U.S. Pat. No. 4,546,244 issued to D. A. B. Miller on Oct. 8, 1985, a nonlinear optical device structure, operating on the basis of optical absorption, was disclosed using a GaAs/AlGaAs multiple quantum well structure. That structure, however, requires that external electrical connections be attached to it. The need for such connections is undesirable in certain commercially important uses of such devices—for example, in crosspoint or other arrays. Also, in that structure the speed of operation (maximum repetition rate) is limited by charge carrier recombination time. Therefore it would be desirable to have a nonlinear optical device structure which does not require external electrical connections and whose speed is not limited by charge carrier recombination time.

SUMMARY OF THE INVENTION

The undersirable need for external electrical connections to a nonlinear optical device structure can be avoided by using in an optical control device a compound semiconductor device structure having an effectively continuously graded chemical composition such that the energy band diagram for the structure has a conduction band edge and a valence band edge which respectively propel electrons and holes in the same direction but with different average speeds, whereby when a second (control) light beam is directed upon the structure, electron-hole pairs are created which temporarily modify an optical property—such as optical birefringence or absorption—of the structure with respect to a first (controlled) light beam. The structure requires no attachment of any electrodes or external connections. The term "effectively continuously graded", as used herein, is intended to include not only graded continuously on a scale as far down as permitted by molecular granularity (molecular distances) but also graded discontinuously, so long as each of the discontinuities is not so severe that the electrons or holes would be trapped because of a resulting bandgap discontinuity (stuck or trapped at a step in the composition grading). Also intended to be included is the case of binary compositional semiconductor superlattices having short spatial periods (about 1.5 nanometers) with variable spatial duty cycles. In such a case, the average relative thicknesses of the two compositionally different semiconductor layers within each period thus determines the average bandgap for each period, the average bandgap varying from period to period, and each period of the superlattice being at least 5 to 10 times shorter than the deBroglie wavelengths of both the holes and the electrons propagating in the superlattice.

It is believed that the modification of the optical property of the device structure is produced by an average spatial separation of electrons from holes occurring just after the electron-hole pairs are created by the control beam, and that this separation of electrons from holes induces an electric dipole moment in the structure, and that the electric field of this dipole in turn induces the modification of the optical property. Moreover, this modification of the optical property disappears when the average separation of electrons from holes disappears, as by virtue of their drifting to positions where they are no longer spatially separated. It should be understood, however, that the success of this invention does not necessarily depend upon the correctness of this theory, and that one embodiment of the invention has already been successfully experimentally tested.

Advantageously, the energy band edge diagram of the structure has at least one quantum well for electrons and one quantum well for holes located at the same position in the structure—in order to supply a well-defined location for electrons and holes to end their separation and hence to enhance the attainable repetition rate.

BRIEF DESCRIPTION OF THE DRAWING

The invention, together with its features, advantages, and characteristics, can be better understood when read in conjunction with the drawings in which.

Only for the sake of clarity none of the drawings is to scale.

DETAILED DESCRIPTION

Figure 1:
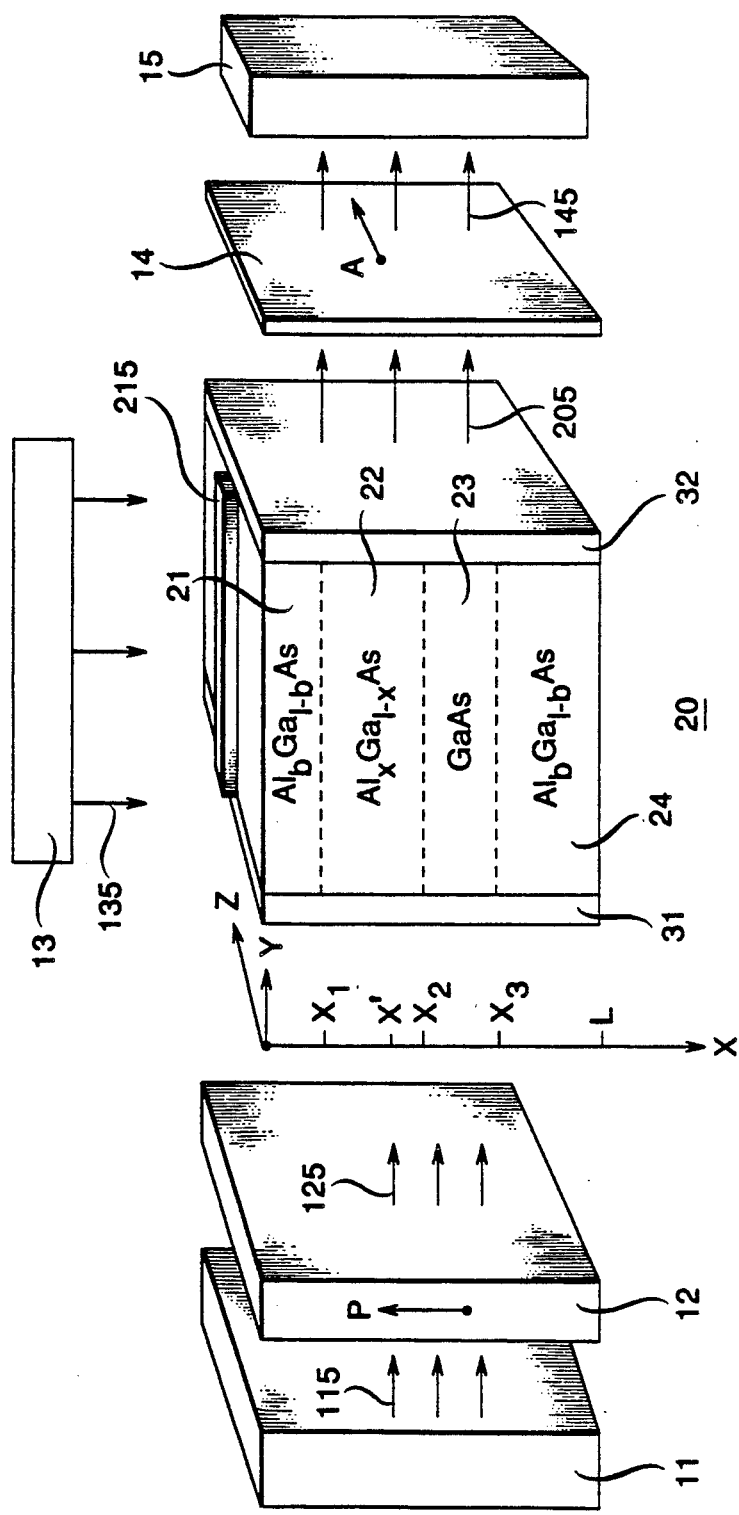
FIG. 1 is a perspective diagram of an optical switching system including an optical control device in accordance with a specific embodiment of the invention

As shown in FIG. 1, an optical source 11 supplies an optical (light) beam 115 to be controlled by a device structure 20, the structure of which is described in greater detail below. The source 11 typically is a laser. The beam 115 is directed upon an optical polarizer 12 (with polarization direction indicated by arrow P) located at a front end of the control device 20. After the beam 115 passes through the polarizer 12, it emerges as a polarized optical beam 125. This beam 125 is incident upon and propagates through the device 20 and emerges therefrom as beam 205. This beam 205 is then incident upon an optical analyzer 14 (with polarization direction indicated by arrow A) and emerges therefrom as beam 145. This beam 145 is then incident upon utilization means 15 processing the beam 145. Typically arrows P and A are perpendicular to each other, and the utilization means 15 comprises opto-electronic circuitry for receiving and processing the beam 145. Propagation of the beam 125 through the device 20 is controlled by another optical source 13, typically a pulsed (flashing) laser, which emits a control optical (light) beam 135. This optical beam 135 is incident upon the control device 20 where it creates electron-hole pairs and thereby controls propagation of the beam 125 therethrough, as described and explained in further detail below.

The control device 20 includes a region 21, extending from $X=0$ to $X=X_1$, composed of $Al_bGa_{1-b}As$, typically with $b=0.5$; a ("graded") region 22 extending from $X=X_1$ to $X=X_2$, composed of $Al_xGa_{1-x}As$ with the mole fraction x of aluminum typically going from $x=0.40$ at $X=X_1$, to $x=0.10$ at $X=X_2$; a region 23 extending from $X=X_2$ to $X=X_3$ composed of GaAs; and a region 24, extending from $X=X_3$ to $X=L$, composed typically again of $Al_bGa_{1-b}As$. It should be understood that these mole fractions b and x are approximate. No intentional doping with any impurities is required in any of these regions, which can be grown by conventional methods, such as molecular beam epitaxy, typically upon an <001> oriented semi-insulating GaAs substrate (not shown), located on the top (or bottom) of the structure 20. On the other hand, doping of the region 22 may affect the repetition rate of the device, by changing either the rise time, the fall time, or both.

Window layers 31 and 32, serve as anti-reflection coatings, as known in the art, and are optional.

Figure 2:
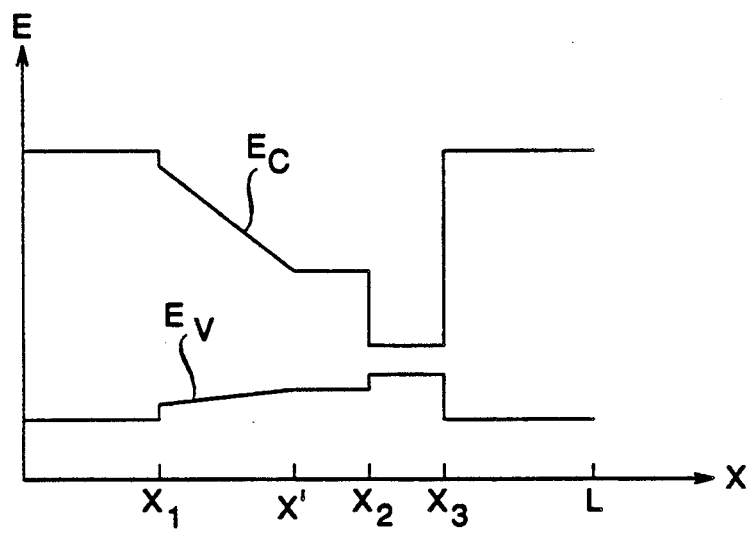
FIG. 2 is an energy band edge diagram of the optical control device shown in FIG. 1.

Typically the mole fraction x in region 22 varies linearly with distance X, except for an advantageous (though optional) distance $(X'X_2)$ located just to the left of $X=X_2$ to supply a region $(X'X_2)$ of constant bandgap energy, as indicated in FIG. 2.

Typically, $X'-X_1=0.5$ to 1.0 $\mu m$; $X_2-X'=0.0$ to 0.2 $\mu m$. The width of region 23 $(X_3-X_2)$ is advantageously at least as much as will accommodate one bound electron state, typically about 4 nanometers $\mu m$ or more. To maximize coupling efficiency and depth of modulation, the cross section of the beam 125 is focused and confined to the regions 22 and 23. Moreover, for the purpose of establishing a suitable waveguide propagation mode, the region 21 is locally thickened with a rib region 215, as known in the art.

The source 11 of the controlled beam is advantageously a laser whose ouput beam 115 has a wavelength corresponding to photons whose energies are nearly equal to, but are less than, the lowest optical transitions in the structure, that is, the transitions in the region $X'X_2$ or $X_2X_3$. Typically this source 11 is a semiconductor which emits light having a wavelength in the approximate range 0.70 to 1.55 $\mu m$. The source 13 is typically either another semiconductor laser or a dye laser. The wavelength of the beam 135 is such that the beam 135 is absorbed in region 22 (to create electron-hole pairs) but is not absorbed in region 21. Optimally, each photon of the beam 135 has an energy as close as possible, but not exceeding the bandgap energy $(E_c-E_v)$ in the region 21, but in any event, the energy of each such photon should exceed the bandgap energy in the region 23. Advantageously, in the Z direction the cross section of the beam 135 is greater than that of the rib region 215.

As shown in FIG. 2, in the region 22 a crucial feature of the conduction band edge $E_c$ as compared with the valence band edge $E_v$ is that the magnitude of the slope (the gradient) of $E_c$ divided by the effective mass of an electron is greater than the slope of $E_v$ divided by the effective mass of a hole, so that the magnitude of the drift velocity of an electron is greater than that of a hole. Note that the direction of the force on an electron is the same as that on a hole—an electron and a hole having charges of opposite sign, the respective band edges $E_c$ and $E_v$ having slopes of opposite signs, and the force on an electron and on a hole being the product of charge and (negative) slope. The average speed of electrons drifting to their potential wells is thus greater than that of holes—whereby a spatial separation of electrons from holes, and hence an electrical dipole moment, is temporarily created in the device structure 20, as explained further in greater detail below.

Consequently, when the source 13 flashes the beam 135 onto the structure 20, electron-hole pairs are created in the structure 20. The electrons in these pairs are propelled with higher average speed to their potential wells than are the holes. Therefore, an electrical dipole moment is induced temporarily in the device 20. This dipole moment temporarily changes an optical property of the structure 20, such as its birefringence, or its absorption, or both, with respect to the beam 125. As known in the art, temporary changes in the birefringence of the structure 20 can be used to induced temporary changes in the intensity of the beam 145 incident upon the utilization means 15, by virtue of the polarizer 12 and the analyzer 14, as is desired in an optical switch or modulator.

There is inherently a change in index of refraction associated with the change in birefringence in response to the beam 135; therefore, in response to the beam 135, there will also be a change in phase delay (phase shift) induced in the controlled beam propagating through the device 20. Thus the system shown in FIG. 1 can be used in conjunction with optical systems operating on the basis of phase modulation in addition to the above described intensity modulation. In optical systems in which such phase modulation—such as phase shift keying—rather than intensity modulation is to be used, the polarizer 12 and analyzer 14 can optionally be removed.

Figure 4:
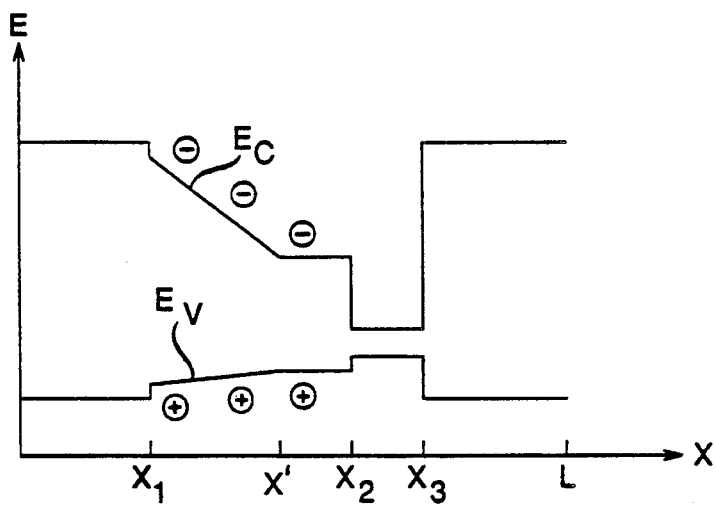
FIGS. 4, 5, and 6 are energy band edge diagrams that are useful in explaining the principles of operation of the invention.
Figure 5:
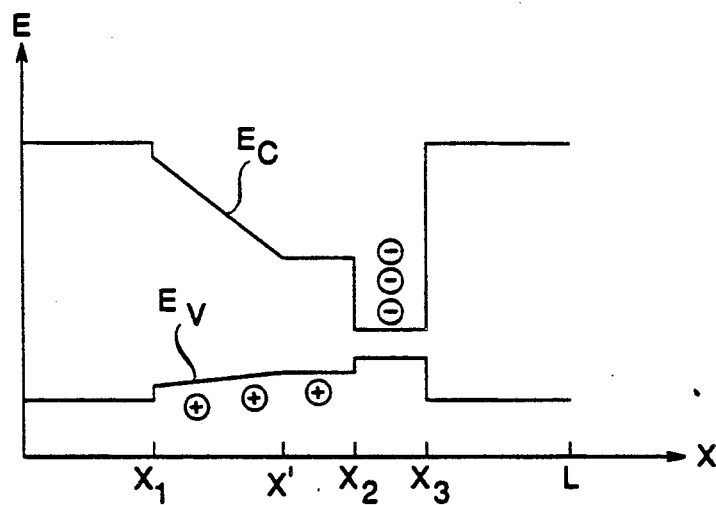
Figure 6:
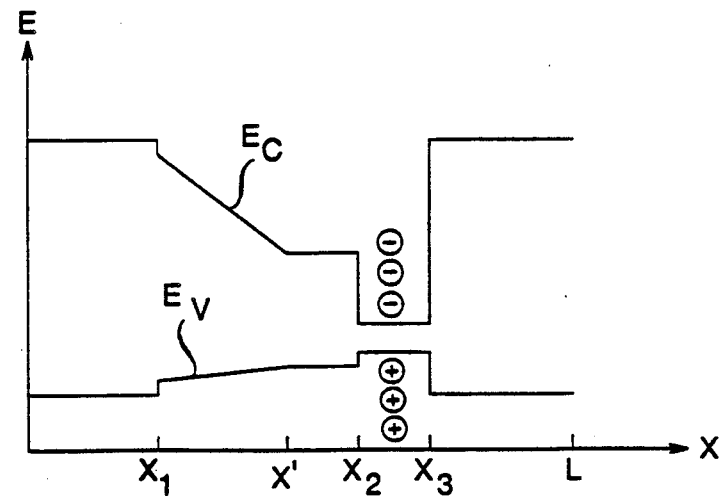

The above described dipole moment creation can be better understood with reference to FIGS. 4-6. As shown in FIG. 4, the beam 135 is suddenly directed upon the device 20, whereby electron-hole pairs are immediately formed therein. Under the influence of the respective fields produced by the electron and hole energy band edges $E_c$ and $E_v$ as indicated in FIG. 5, the electrons and holes drift toward their quantum potential well located at $X_2X_3$, but with different average speeds, whereby the electrons arrive at, and are captured by, the well at a time when the holes have not yet done so. Accordingly, a spatial separation of electrons and holes occurs, and hence an electric dipole moment in the X direction is temporarily induced in the structure 20. Finally, the holes arrive at, and are captured by, their well, as indicated in FIG. 6, whereby the dipole moment is extinguished, whereby the device structure is ready for repeat performance of dipole induction by means of a fresh beam 135 (with or without an intervening recombination of electrons and holes). It should be understood that while the quantum wells facilitate larger separation of electrons and holes hence serve to increase induced dipole moment, they are not essential, and therefore the region 23 can be omitted. That is, the region 22 can be contiguous with the region 24.

The above described induced dipole can thus be used to control the beam 115 by inducing the property of birefringence with respect to the beam 115. The region $X'X_2$, where $E_c-E_v$ is constant, provides an extended region having a constant value of increased birefringence, which is advantageous though not essential. That is, it is possible to make $X'X_2$ equal to zero.

Based upon preliminary experiments with a device structure similar to the structure 20, for a beam 115 of wavelength equal to about 1.06 $\mu$m and a beam 135 of wavelength equal to about 0.60 $\mu$m and having equal to about 20 fj/$\mu$m$^2$, a repetition rate as fast as 10 GHz (100 picosecond) is expected. By a "similar structure" it is meant that the structure comprised regions 22, 23, 24 in a repeated spatial sequence. However, it is believed that such sequenced structures are not necessarily preferred. Thus far with non-optimized devices, a modulation of one part in ten thousand has been attained.

For maximum modulation effect, the polarizer 12 has its polarization P oriented at an angle of 45° with respect to the optically induced birefringent axes of the structure 20.

Figure 3:
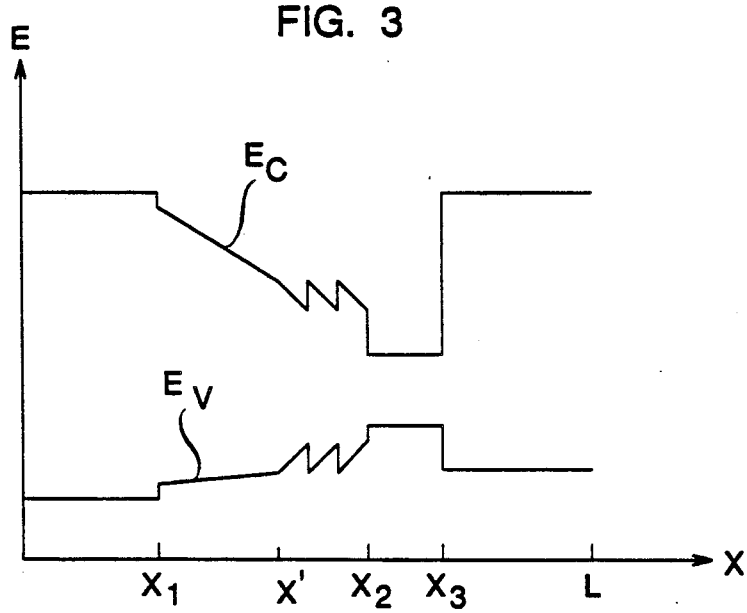
FIG. 3 is an energy band edge diagram of another control device useful in the system shown in FIG. 1, in accordance with another specific embodiment of the invention.

As shown in FIG. 3, the energy diagram of the device structure 20 can be modified to yield a multiple quantum well structure, in order to provide a nonlinear device adapted specifically for operating by absorption. That is, the polarizer 12 and the analyzer 14 can be removed while the structure 20 directly modulates the intensity of the controlled beam. Here as before the beam 135 creates electron-hole pairs in which the electrons drift faster than the holes to their quantum well located in the region 23 ($X_2X_3$), whereby a dipole moment is induced. In turn, the electric field of this dipole shifts the energy level(s) in the multiple quantum wells located in the region 22 ($X'X_2$), which shifts absorption edge of the (modified) device 20 with respect to the beam 115—by way of the quantum Stark effect. Thus, if this shift of absorption edge is sufficient, it can cause absorption of the beam 115 in response to the beam 135. Typically the number of wells located in region 22 in the structure is about ten (rather than the mere two wells shown in FIG. 3 for convenient illustrative purposes), but one or two wells may be useful. In this way, after the electrons (but not the holes) have drifted to their quantum well, as indicated in FIG. 5, a relatively large number of electrons will be found in the well located in the region 23 ($X_2X_3$), whereby the energy levels in the multiple wells located in the region $X'X_2$ are shifted (quantum Stark effect), and hence the optical absorption is modified.

Although the invention has been described in detail with respect to specific embodiments, various modifications can be made without departing from the scope of the invention. For example, a quater-wave plate can be inserted between the polarizer 12 and the structure 20. Also various other orientations of the optical beams can be used: for example, the beam 135 can be directed in the Z direction (perpendicular to the plane of the drawing). In addition, instead of the single region $X_1X_3$ shown in FIG. 2, successive identical such regions can be integrated into the device 20, typically about fifty such spatial regions, each such region (period) being similar to the region $X_1X_3$ except that the thickness of the region $X^1X_1$ in each period should then be typically about 0.05 $\mu$m.

Finally, the functional equivalent of the region $X_1X_3$ can be achieved by using molecular beam epitaxy of alternating layers of $Al_bGa_{1-b}As$ and GaAs with fixed b (b=0.2 to 0.5) and with variable spatial duty cycle—as described, for example, in a paper entitled "MBE Growth and Energy Levels of Quantum Wells with Special Shapes" by A. C. Gossard et al., published in *Surface Sciences*, vol. 174 pp. 131–135 (1986) (preferably using a linear, rather than a quadratic, dependence of layer thickness upon running index i on p. 134).

We claim:
1. An optical control system comprising
    (a) a compound semiconductor device structure having a semiconductor layer that has an effectively continuously graded bandgap such that the energy band diagram for the layer has an effectively continuously graded conduction band edge and an effectively continuously graded valence edge which propels electrons and holes, respectively, in the same direction but with different average speeds;
    (b) a source of a second light beam; and
    (c) a source of a first light beam incident upon the structure,
        whereby when the second light beam is directed upon the structure an optical property of the structure with respect to the first beam is modified.
2. An optical control system according to claim 1 in which the optical property is birefringence or phase delay.
3. An optical control system to claim 1 in which the optical property is absorption.
4. An optical control system in accordance with claim 3 in which the conduction band edge has at least one quantum well for electrons and the valence band edge has at least one quantum well for holes which is located at the same position as the quantum well for electrons.
5. An optical control system in accordance with claim 4 in which the optical property is either birefringence or phase delay.
6. An optical control system according to claim 4 in which the optical property is absorption.
7. An optical control system according to claim 6 further including means for utilizing the first beam after it propagates through the device structure.
8. An optical control system in accordance with claim 2 further including utilization means for utilizing the first beam after it propagates through the semicon- ductor device structure and further comprising an optical polarizer and an optical analyzer repectively located between the source of the first beam and the semiconductor device structure and between the semiconductor device structure and the utilization means.

9. An optical control system according to claim 1 in which no electrodes or external electrical connections are attached to the device structure.

10. An optical control system according to claim 9 further including means for utilizing the first beam after it propagates the device structure.

11. An optical control system according to claim 1 further including means for ultilizing the first beam after it propagates through the device structure.

12. An optical control system according to claim 5 further including means for utilizing the first beam after it propagates through the device structure.

* * * * *

UNITED STATES PATENT AND TRADEMARK OFFICE
CERTIFICATE OF CORRECTION

PATENT NO. : 4,999,485
DATED : March 12, 1991
INVENTOR(S) : Federico Capasso, Stephen E. Ralph It is certified that error appears in the above-identified patent and that said Letters Patent is hereby corrected as shown below:

ON THE TITLE PAGE:

In the Title and in Col. 1, line 1, change "NONLINERAR" to --NONLINEAR--.

Column 6, line 48, "is birefringence" should read
--is either birefringence--.

Column 8, line 3, "propagates the" should read --propagates through the--.

Signed and Sealed this

Thirty-first Day of August, 1993

*Attest:*

BRUCE LEHMAN

*Attesting Officer*     *Commissioner of Patents and Trademarks*